(12) United States Patent
Watanabe et al.

(10) Patent No.: US 7,837,375 B2
(45) Date of Patent: Nov. 23, 2010

(54) PLANAR ILLUMINATION DEVICE AND LIQUID CRYSTAL DISPLAY DEVICE USING THE PLANAR ILLUMINATION DEVICE AS A BACKLIGHT

(75) Inventors: Saburo Watanabe, Ichinomiya (JP); Hiroshi Tokuyama, Mobara (JP); Seiichi Nishiyama, Mobara (JP)

(73) Assignees: Hitachi Displays, Ltd., Chiba-Ken (JP); Hitachi Display Devices, Ltd., Chiba-Ken (JP)

( * ) Notice: Subject to any disclaimer, the term of this patent is extended or adjusted under 35 U.S.C. 154(b) by 605 days.

(21) Appl. No.: 11/640,871

(22) Filed: Dec. 19, 2006

(65) Prior Publication Data
US 2007/0152135 A1     Jul. 5, 2007

(30) Foreign Application Priority Data
Dec. 21, 2005     (JP)     ............................... 2005-368428

(51) Int. Cl.
*F21V 7/04* (2006.01)
(52) U.S. Cl. ..................... 362/613; 362/612; 362/610
(58) Field of Classification Search ............... 362/600, 362/630, 613, 612, 603, 610, 611, 235, 238, 362/621; 385/901; 349/68
See application file for complete search history.

(56) References Cited

U.S. PATENT DOCUMENTS

| | | | |
|---|---|---|---|
| 5,528,709 A * | 6/1996 | Koike et al. ................... 385/14 |
| 6,913,366 B2 * | 7/2005 | Lee ............................. 362/628 |
| 6,921,178 B2 | 7/2005 | Ohkawa | |
| 7,108,413 B2 * | 9/2006 | Kwong et al. ............... 362/583 |
| 7,158,020 B2 * | 1/2007 | Grady, Jr. .................... 340/473 |
| 7,367,704 B1 * | 5/2008 | Chang ......................... 362/621 |
| 7,554,625 B2 | 6/2009 | Koganezawa | |
| 2002/0175632 A1 | 11/2002 | Takeguchi | |
| 2006/0078267 A1 | 4/2006 | Cha et al. | |
| 2008/0101089 A1 * | 5/2008 | Chang ......................... 362/621 |

FOREIGN PATENT DOCUMENTS

| JP | 2004-006187 | 1/2004 |
|---|---|---|
| JP | 2004-133391 | 4/2004 |
| JP | 2004-200072 | 7/2004 |
| JP | 2005-174784 | 6/2005 |
| JP | 2005-339822 | 12/2005 |

\* cited by examiner

*Primary Examiner*—Anabel M Ton
(74) *Attorney, Agent, or Firm*—Antonelli, Terry, Stout & Kraus, LLP.

(57) ABSTRACT

A planar illumination device is provided that can achieve even distributions of mixed colors and luminance, downsizing and weight saving without lowering the luminous efficiency of LED chips. In addition, a liquid crystal display device using the planar illumination device as a backlight is provided.

A polygonal flat plate-like light guide plate GLB is combined with a plurality of LED chips D1, D2, D3 emitting light with different colors from each other to constitute a color mixing unit DUT. A plurality of the color mixing units are arranged on printed circuit boards RFB having a reflection function to constitute a planar illumination device. The planer illumination device is installed on the back of a liquid crystal display panel, thus constituting a liquid crystal display device.

6 Claims, 8 Drawing Sheets

PLANAR ILLUMINATION DEVICE AND LIQUID CRYSTAL DISPLAY DEVICE USING THE PLANAR ILLUMINATION DEVICE AS A BACKLIGHT

CLAIM OF PRIORITY

The present application claims priority from Japanese Application JP 2005-368428 filed on Dec. 21, 2005, the content of which is hereby incorporated by reference into this application.

BACKGROUND OF THE INVENTION

The present invention relates generally to planar illumination devices and liquid crystal display devices using the planar illumination devices. In particular, the invention relates to an illumination device that uses a plurality of point light sources comprising solid light-emitting elements such as light-emitting diodes as illumination light sources for a liquid crystal display panel, mixes light from the point light sources and planarly emits the resulting white light or the desired resulting color light, and to a liquid crystal display device using the illumination device as a backlight.

A liquid crystal display device is equipped with a illumination device in order to visualize electronic latent images formed on its liquid crystal display panel except liquid crystal display devices using outside light. The illumination device is installed on the back or front of the liquid crystal display panel. In general, the illumination device installed on the back of the liquid crystal display panel is called a backlight and the illumination device installed on the front of the panel is called a frontlight.

Some backlights for small-sized handheld terminals such as cellular phones include a light guide having a cold-cathode fluorescent lamp disposed on the side surface (side edge or incident surface) thereof as with lap-top computers with a relatively large display screen. However, backlights suited to handheld terminals use a single of or a plurality of point light sources, solid light-emitting elements, typified by light-emitting diodes with small power consumption in place of cold-cathode fluorescent lamps. Incidentally, the backlights using such solid light-emitting elements are applied to a display monitor for a lap-top computer or other handheld terminals and to a display of a television receiver. A description is here made using a light-emitting diode (hereunder, also abbreviated as an LED) as a solid light-emitting element by way of example.

The known backlights include a side edge type in which a light source is installed on the side edge of a light guide plate and a directly-beneath type in which a light source is installed directly on the back of a liquid crystal display panel. A backlight using LEDs is characterized by good color reproducibility and generally employs the side edge type using a light guide plate in view of reducing a thickness, weight and power consumption. The side edge type backlight using LEDs is configured as a surface light source as below. The LEDs are attached on the side surface of a transparent plate (light guide plate) made of acryl plate or the like. In addition, while being propagated in the light guide plate, the light emitted from the LED changes its course to the surface of the light guide plate. The backlight of this type is disclosed by e.g. Japanese Patent Laid-open Nos. 2004-200072 and 2004-6187.

In addition, the LEDs disclosed in the patent documents mentioned above are attached to the side surface of the light guide plate so that those light-emitting axes may be parallel to the plain surface of the light guide plate. Japanese Patent Laid-open No. 2004-133391 discloses that a special lens is attached to the light-emitting surface of an LED so that light is emitted in a direction perpendicular to the light-emitting axis thereof.

SUMMARY OF THE INVENTION

Since the illuminating light of the backlight needs to be white, the directly-beneath type backlight using an LED is configured by combining LED chips each emitting single-color light of red (R), green (G) and blue (B), which are light's three primary colors, and mixing the color light emitted therefrom to provide white light. In this case, since the LED chips are point light sources, irregular color tends to occur.

If three colors are mixed, it is generally necessary that three LED chips approximate one another or are spaced apart from a liquid crystal display panel. However, the approximation of the LED chips has limitation and increases their temperatures to lower the luminous efficiency of the LED chips. In addition, increasing the distance between the LED chips and the display panel increases the thickness of the backlight, thereby hindering the downsizing and weight saving of the liquid crystal display device. Further, when a white planar illumination device is configured by arranging a large number of three-color LEDs, characteristic variations among the LEDs cause the uneven distribution of mixed colors and luminance.

It is an object of the present invention to provide a planar illumination device that achieves even distributions of mixed colors and luminance, downsizing and weight saving without lowering the luminous efficiency of an LED chip and a liquid crystal display device using the planar illumination device as a backlight.

A planar illumination device of the present invention is of a directly-beneath type backlight color-mixing structure having the arrangement of a plurality of color mixing units. The color mixing unit is configured by combining a polygonal flat plate-like light guide plate with a plurality of LED chips emitting light with a color different from the other LED chips. White light produced by the color mixing units is emitted toward the planar surface of the light guide plate. A large number of the color mixing units are arranged two-dimensionally to form the planer illumination device with a desired area. The planer illumination device is installed on the back of a liquid crystal display panel, thus forming a liquid crystal display device.

The light guide plate constituting part of each color mixing unit is of a triangle or other polygons in planar shape. The corners of the light guide plate are cut off to form corresponding cut faces. LED chips emitting light with a primary color different from the other LED chips are each attached to a corresponding one of the cut faces. If a regular-triangular light guide plate is used, LED chips emitting red (R) light, green (G) light and blue (B) light are attached to the side walls of the cut faces formed at the corners, respectively.

White dots are printed on the undersurface (rear surface) of the light guide plate. Alternatively, the undersurface of the light guide plate is subjected to engraving. A reflection sheet is attached to the side surfaces of the sides of the light guide plate excluding the corners attached with the LED chips. A reflection plate is provided on the back of the reflection sheet. A diffusion sheet is provided on the upper surface (a surface facing the back of a liquid crystal display panel) of the light guide plate. Thus, the color mixing unit is configured. With such a color mixing unit, light emitted from the LED chips is mixed in the central region of the light guide plate to form white light. The white light is emitted from the upper surface of the light guide plate to the liquid crystal display panel by the action of the white printed dots or dints (shibo). The mechanism of emitting light from the plain surface of the light guide plate is the same as that of the known side edge type backlight. A plurality of the color mixing LED units described above are arranged two-dimensionally to constitute a backlight having a desired spread.

If a quadrangular light guide plate is used, the corners of the light guide plate are cut off to form corresponding cut faces. A LED chip emitting red (R) light and a LED chip emitting green (G) light are attached to respective cut faces located on a diagonal line of the light guide plate, and LED chips emitting blue (B) light are attached to cut faces located on the other diagonal line. This is because the luminous efficiency of the LED chip emitting blue (B) light is lower than those of the other LED chips. This is only an example. If the luminous efficiency of the LED chip emitting red (R) or green (G) light is low, or if the luminance of a specific color is increased, two LED chips emitting light with the color corresponding thereto may be used. This means that two LED chip emitting light with another color can be used taking into account the luminous efficiency and color rendering thereof.

If a light guide plate is of a polygon with five or more corners including a pentagon and hexagon, LED chips emitting red (R) light and green (G) light and LED chips emitting blue (B) light are appropriately combined with one another, thereby forming white light or color light adjusted for desired color rendering.

The above-described planar illumination device according to the present invention can achieves even distributions of mixed colors and luminance, downsizing and weight saving without lowering the luminous efficiency of an LED chip. Needless to say, the planar illumination device can be applied to various technical fields while serving as a planar light source. In particular, the planar illumination device is here used as a backlight and combined with a liquid crystal display panel to thereby provide a liquid crystal display device that can be reduced in thickness or in thickness and size, provide lower power consumption and exhibit high-brightness and high-quality.

DETAILED DESCRIPTION OF THE PREFERRED EMBODIMENTS

Preferred embodiments of the present invention will be hereunder described in detail with reference to the drawings.

First Embodiment

Figure 1A:
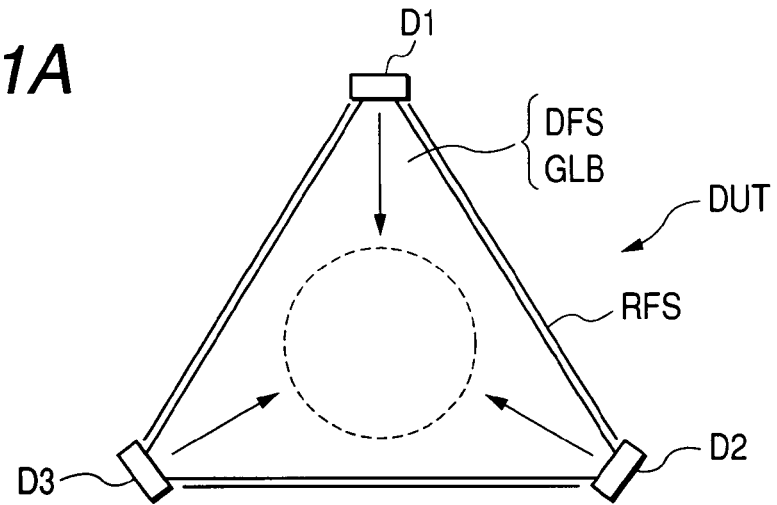
FIGS. 1A and 1B are schematics illustrating an essential part of a color mixing unit for assistance in explaining a planar illumination device according to a first embodiment of the present invention.
Figure 1B:
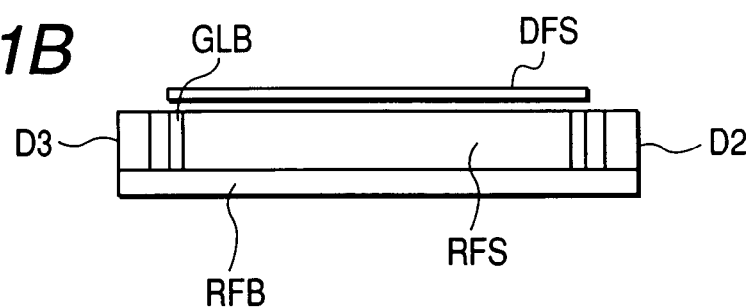
Figure 2:
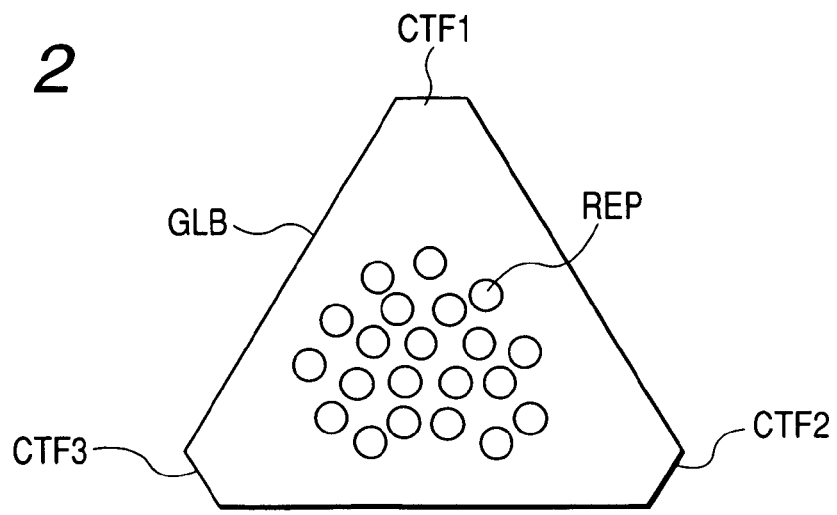
FIG. 2 is a schematic of the undersurface of a light guide plate of FIG. 1.

FIGS. 1A and 1B are schematics illustrating an essential part of a color mixing unit for assistance in explaining a planar illumination device according to a first embodiment of the present invention. FIG. 1A is a plan view and FIG. 1B is a side view as viewed from an arrow direction of FIG. 1A. FIG. 2 is a schematic of the undersurface of a light guide plate of FIGS. 1A and 1B. A backlight of the first embodiment is configured by arranging a plurality of color mixing units two-dimensionally.

A color mixing unit DUT shown in FIGS. 1A and 1B includes a transparent light guide plate GLB preferably made of an acryl resin plate, LED chips D1, D2, D3, a reflection sheet RFS, a reflection plate RFB, and a diffusion sheet DFS. The light guide plate GLB of the first embodiment is triangular and has three corners cut off to form cut faces CTF1, CTF2, CTF3 facing the center of the triangle. The LED chips D1, D2 and D3 are attached to the cut faces CTF1, CTF2 and CTF3, respectively. Incidentally, explanation is made here on the assumption that the LED chips D1, D2 and D3 emit red (R) light, green (G) light and blue (B) light, respectively.

A plurality of white dots REP are printed on the back of the light guide plate GLB. The white dots have a function of emitting light incident from an LED unit toward the upper surface of the light guide plate GLB. Instead of printing such white dots, the back of the light guide plate may be subjected to engraving to form a large number of dints called "shibo" (sometimes including bosses), thereby providing the same function. The diffusion sheet DFS is placed on the upper surface of the light guide plate GLB. The diffusion sheet DFS may be a diffusion board. The reflection sheet RFS is put on the side surface of the light guide plate GLB excluding the portions attached with the LED chips.

In the color mixing unit having such a configuration, red (R) light, green (G) light and blue (B) light emitted from the LED chips D1, D2 and D3, respectively, are directed into the inside of the light guide plate GLB. The red (R) light, green (G) light and blue (B) light directed are mixed in a central portion of the guide light board GLB indicated with a broken line to form white light, which is then emitted therefrom toward the upper surface of the light guide plate GLB. It should be noted that adjusting respective electric currents supplied to the LED chips D1, D2 and D3 can freely set the chromaticity coordinates of the white light.

Figure 3A:
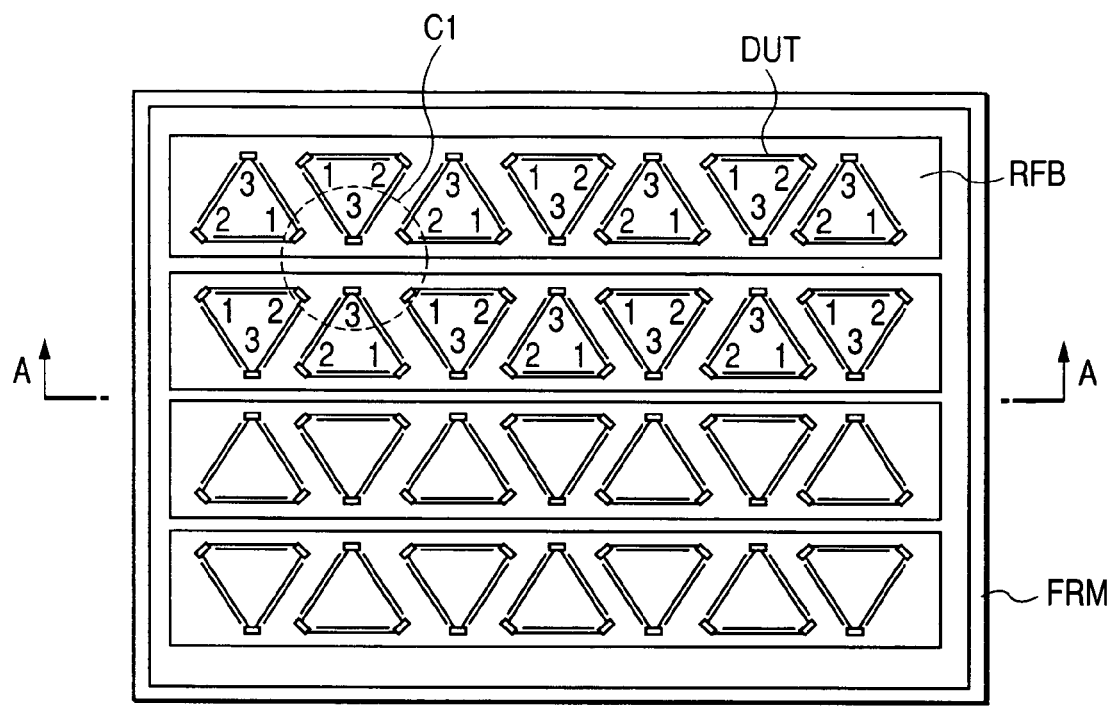
FIGS. 3A and 3B illustrate the planar illumination device according to the first embodiment of the present invention.
Figure 3B:
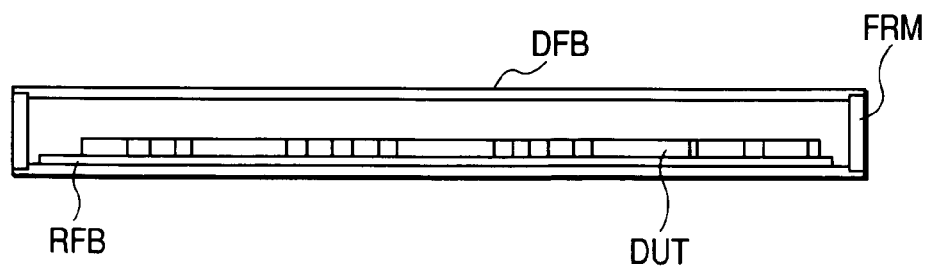

FIGS. 3A and 3B illustrate a planar illumination device according to the first embodiment of the present invention.

FIG. 3A is a plan view and FIG. 3B is a cross-sectional view taken along ling A-A of FIG. 3A. The planar illumination device is configured by two-dimensionally arranging a plurality of the color mixing units DUT described with FIGS. 1A and 1B. The planar illumination device of the first embodiment is configured such that seven color mixing units DUT are mounted on a strip printed circuit board RFB and four printed circuit boards RFB are planarly housed in a bottomed frame FRM. The upper surface (on which the color mixing units DUT are mounted) of the printed circuit board RFB serves as a reflection surface. Incidentally, a reflection sheet may be provided in place of this reflection surface.

As described above, the planar illumination device is composed of 28 color mixing units DUT. As indicated with a broken line circle C1 in FIG. 3A, the triangular color mixing units DUT are alternately arranged upside down in the frame FRM so that LED chips emitting light with the same color in the adjacent color mixing units should not be adjacent to each other. Thus, even color mixture is ensured.

Second Embodiment

Figure 4:
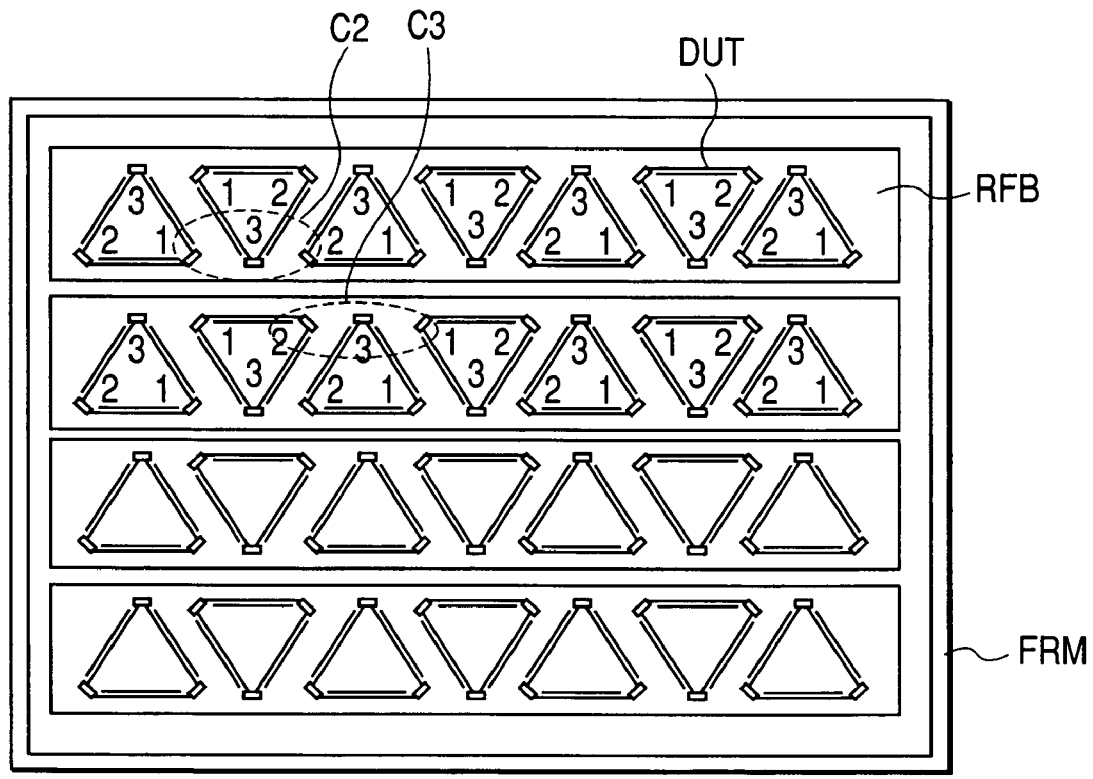
FIG. 4 is a plan view of a planar illumination device according to a second embodiment of the present invention similarly to FIG. 3A.

FIG. 4 is a plan view of a planar illumination device according to a second embodiment of the present invention similarly to FIG. 3A. A color mixing unit DUT has the same configuration as that of the first embodiment. In this embodiment, the color mixing units DUT are mounted on printed circuit boards RFB. The printed circuit boards FRB are arranged in a frame FRM in such a manner that their longitudinal directions are parallel to a lateral direction of FIG. 4. The color mixing units DUT placed in even rows of the printed circuit boards RFB are arranged with a shift of one color mixing unit in the lateral direction of FIG. 4. Also in this arrangement shown with a broken line ellipse C2, C3 in FIG. 4, LED chips emitting light with the same color are not adjacent to each other. Thus, even color mixture is ensured. The other configurations are the same as those of FIGS. 3A and 3B.

Third Embodiment

Figure 5A:
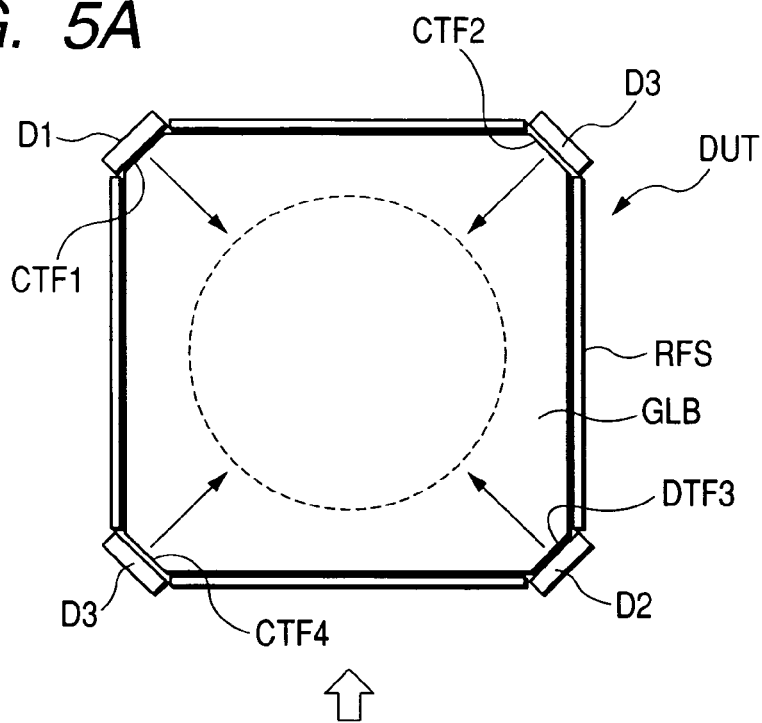
FIGS. 5A and 5B illustrate a planar illumination device according to a third embodiment of the present invention.
Figure 5B:
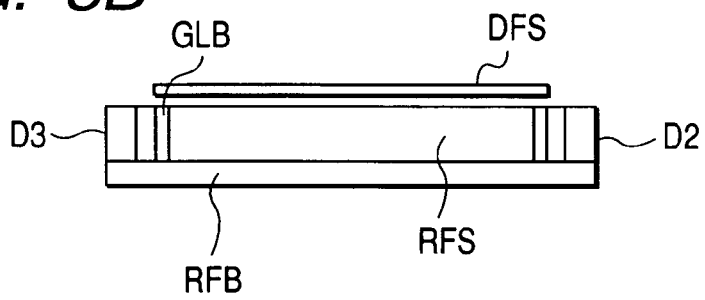

FIGS. 5A and 5B illustrate a planar illumination device according to a third embodiment of the present invention. FIG. 5A is a plan view and FIG. 5B is a side view taken along the white arrow of FIG. 5A. In the third embodiment, a light guide plate GLB is quadrangular and has four corners cut off to form cut faces CTF1, CTF2, CTF3 and CTF4 which face the center of the quadrangle. LED chips D1, D3, D2 and D3 are attached to the cut faces CTF1, CTF2, CTF3 and CTF 4, respectively. Similarly to FIG. 1, it is assumed that the LED chips D1, D2 and D3 emit red (R) light, green (G) light and blue (B) light, respectively.

In the third embodiment, the LED chips D1, D3, D2 and D3 are attached to the cut faces CTF1, CTF2, CTF3 and CTF4, respectively, of the quadrangular light guide plate GLB. A light mixing unit DUT of the third embodiment is the same as that described with FIG. 1 except that the light guide plate GLB is quadrangular and the four LED chips in total are each attached to a corresponding one of the cut faces.

Figure 6:
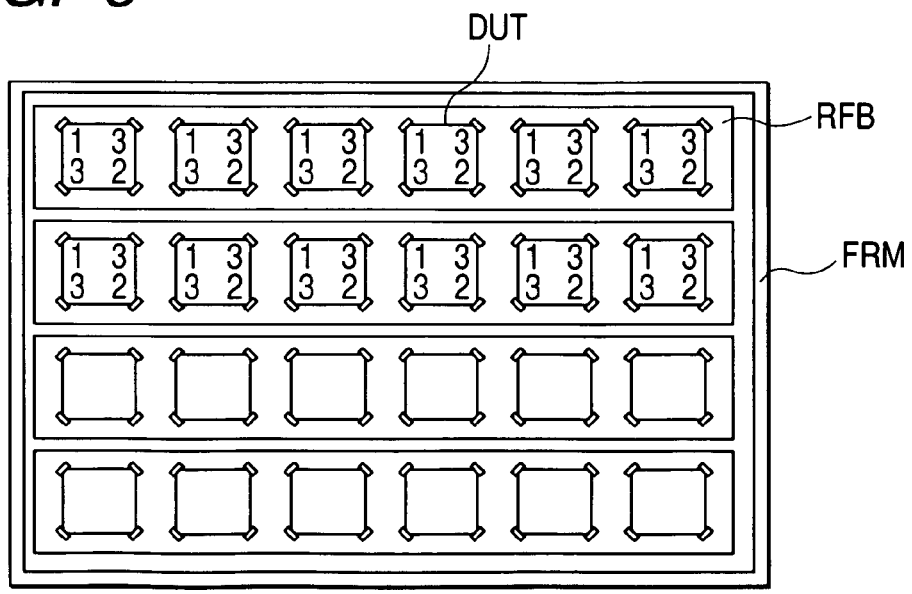
FIG. 6 is a plan view for assistance in explaining the planar illumination device according to the third embodiment of the invention similarly to FIGS. 3A and 4.

FIG. 6 is a plan view for assistance in explaining the planar illumination device according to the third embodiment of the invention similarly to FIGS. 3A and 4. Also in this embodiment, the color mixing units DUT are mounted on printed circuit boards RFB. The printed circuit boards FRB are arranged in a frame FRM in such a manner that those longitudinal directions are parallel to a lateral direction of FIG. 6. The color mixing units DUT are arranged so that the LED chips closest to each other are ones emitting light with different colors. In other words, LED chips emitting light with the same color are arranged so as not to be adjacent to each other. Thus, even color mixture is ensured.

Figure 7A:
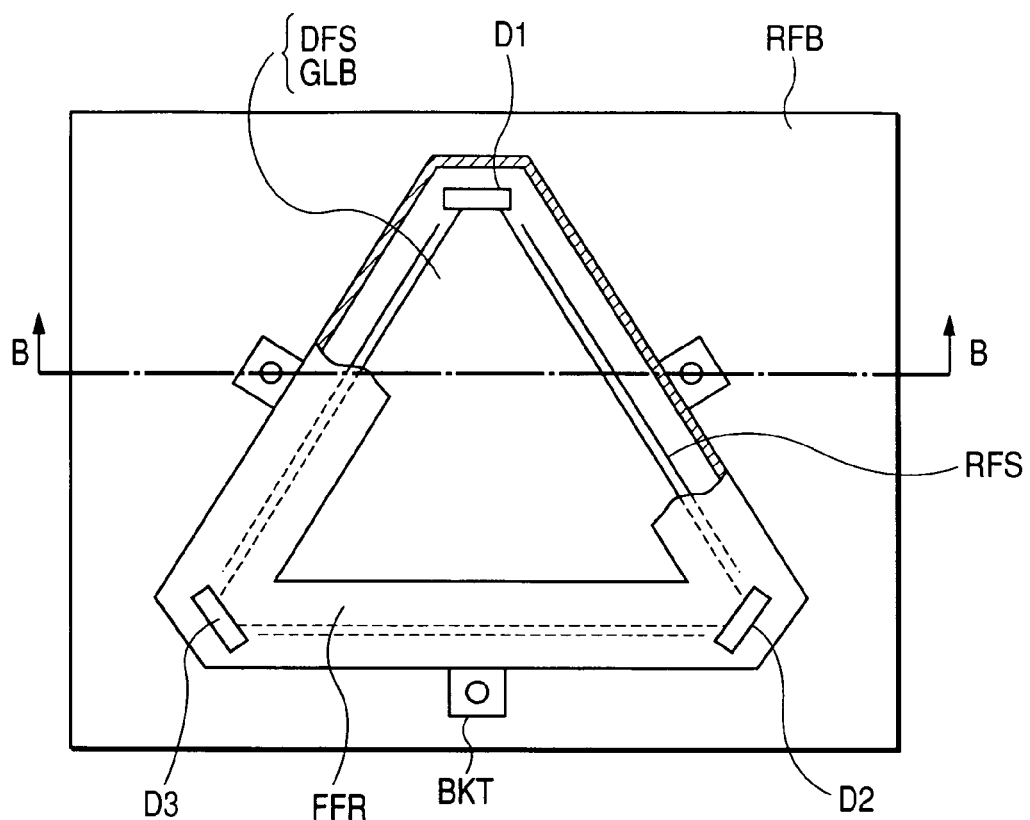
FIGS. 7A and 7B illustrate a fixing structure of the color mixing unit of the planar illumination device according to the first or second embodiment of the invention.
Figure 7B:
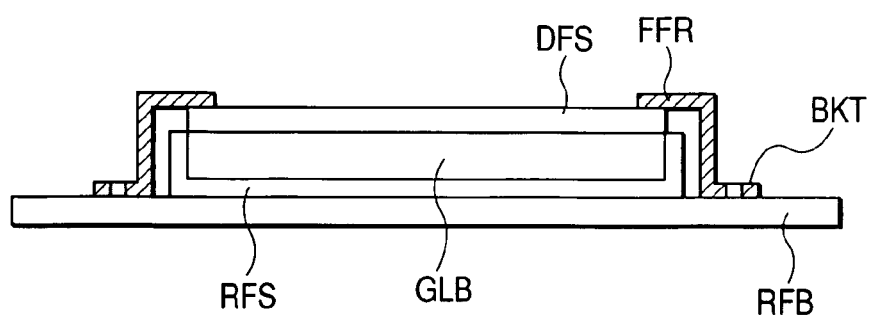

FIGS. 7A and 7B illustrate a fixing structure of the color mixing unit of the planar illumination device according to the first or second embodiment of the invention. FIG. 7A is a plan view and FIG. 7B is a cross-sectional view taken along line B-B of FIG. 7A. The color mixing unit DUT is fixed to a printed circuit board RFB by means of a fixing frame FFR. More specifically, the fixing frame FFR is covered on the color mixing unit DUT shown in FIG. 1. In addition, the color mixing unit DUT is fixed by screwing brackets (with screw holes) formed on the three sides of the fixing frame FFR to the printed circuit board RFB. In this case, a diffusion sheet DFS is sandwiched between the fixing frame FFR and the light guide plate GLB. An appropriate spacer may be entirely or partially interposed between the diffusion sheet DFS and the light guide plate GLB to define a gap therebetween.

Figure 8A:
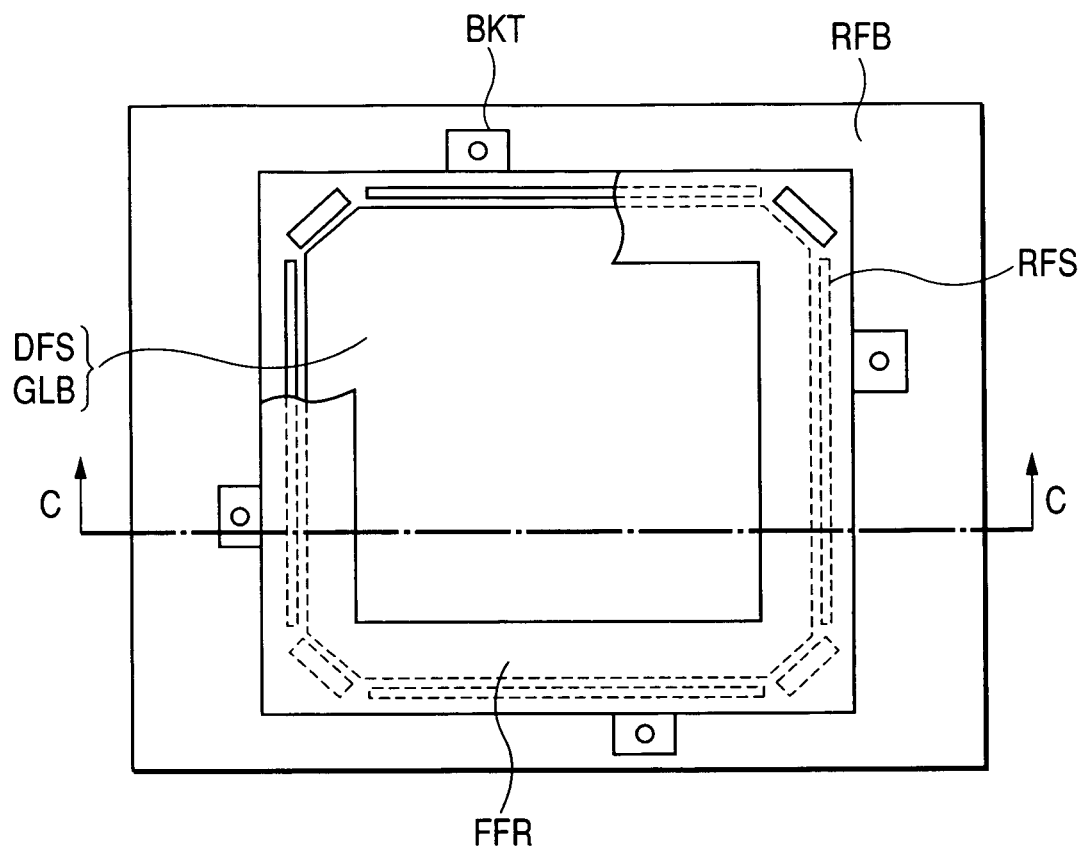
FIGS. 8A and 8B illustrate a fixing structure of the color mixing unit of the planar illumination device according to the third embodiment of the invention.
Figure 8B:
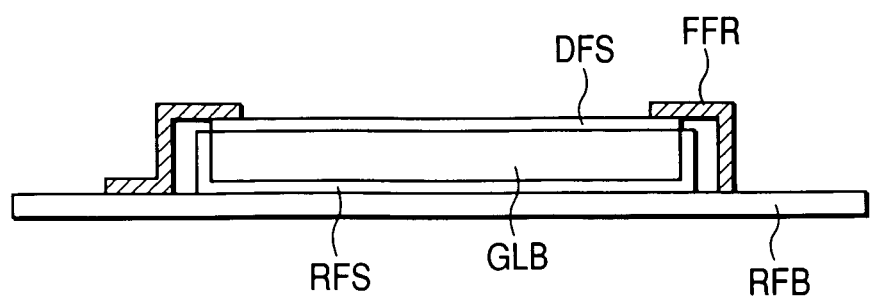

FIGS. 8A and 8B illustrate a fixing structure of the color mixing unit of the planar illumination device according to the third embodiment of the invention. FIG. 8A is a plan view and FIG. 8B is a cross-sectional view taken along line C-C of FIG. 8A. The color mixing unit DUT is fixed to a printed circuit board RFB by means of a fixing frame FFR. The fixing frame FFR is covered on the color mixing unit DUT shown in FIGS. 5A and 5B. In addition, the color mixing unit DUT is fixed by screwing brackets formed on the fourth sides of the fixing frame FFR to the printed circuit board RFB. In this case, a diffusion sheet DFS is sandwiched between the fixing frame FFR and the light guide plate GLB. An appropriate spacer may be entirely or partially interposed between the diffusion sheet DFS and the light guide plate GLB to define a gap therebetween.

Figure 9:
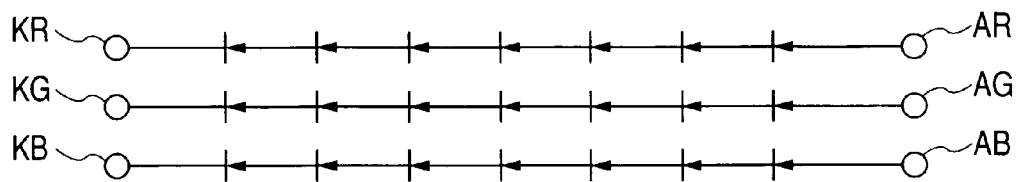
FIG. 9 illustrates wiring of the LED chips of the planar illumination device according to each embodiment of the invention by way of example.

FIG. 9 illustrates wiring of the LED chips of the planar illumination device according to each embodiment of the invention by way of example. The LED chips of the color mixing units mounted on the printed circuit board are connected in series to each other. In addition, electricity is supplied to cathode terminals KR, KG and KB from anode terminals AR, AG and AB for the LED chips D1, D2 and D3, respectively.

Figure 10:
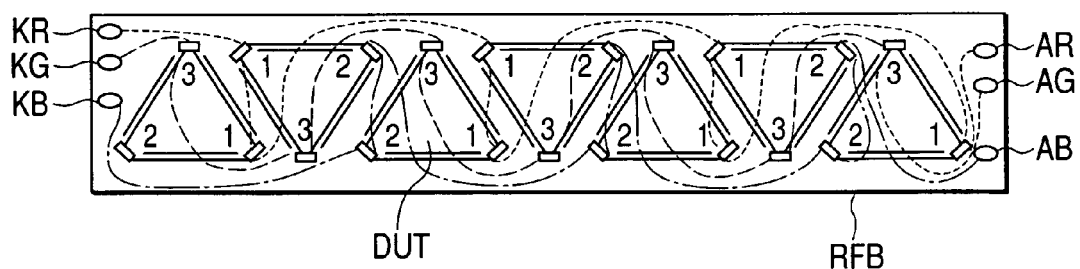
FIG. 10 is an explanatory diagram illustrating a typical wiring structure of a printed circuit board RFB on which the color mixing units of the planar illumination device according to the first or second embodiment of the invention are mounted.

FIG. 10 is an explanatory diagram illustrating a typical wiring structure of a printed circuit board RFB on which the color mixing units of the planar illumination device according to the first or second embodiment of the invention are mounted. Wiring connection of red (R) LED chips is indicated with dotted lines, wiring connection of green (G) LED chips is indicated with broken lines and wiring connection of blue (B) LED chips is indicated with chain lines.

Figure 11:
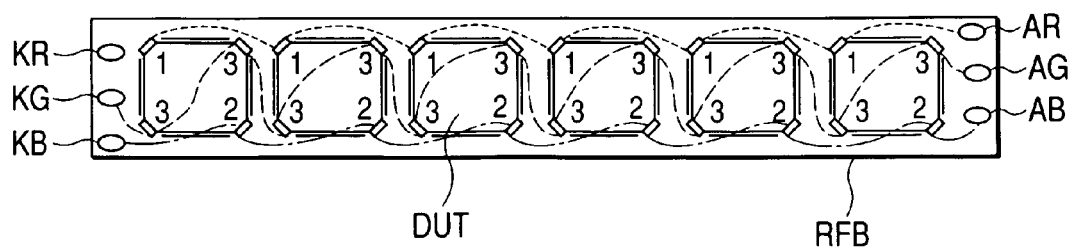
FIG. 11 is an explanatory diagram illustrating a typical wiring structure of a printed circuit board RFB on which the color mixing units of the planar illumination device according to the third embodiment of the invention are mounted.

FIG. 11 is an explanatory diagram illustrating a typical wiring structure of a printed circuit board RFB on which the color mixing units of the planar illumination device according to the third embodiment of the invention are mounted. Wiring connection of red (R) LED chips is indicated with dotted lines, wiring connection of green (G) LED chips is indicated with broken lines and wiring connection of blue (B) LED chips is indicated with chain lines.

Figure 12:
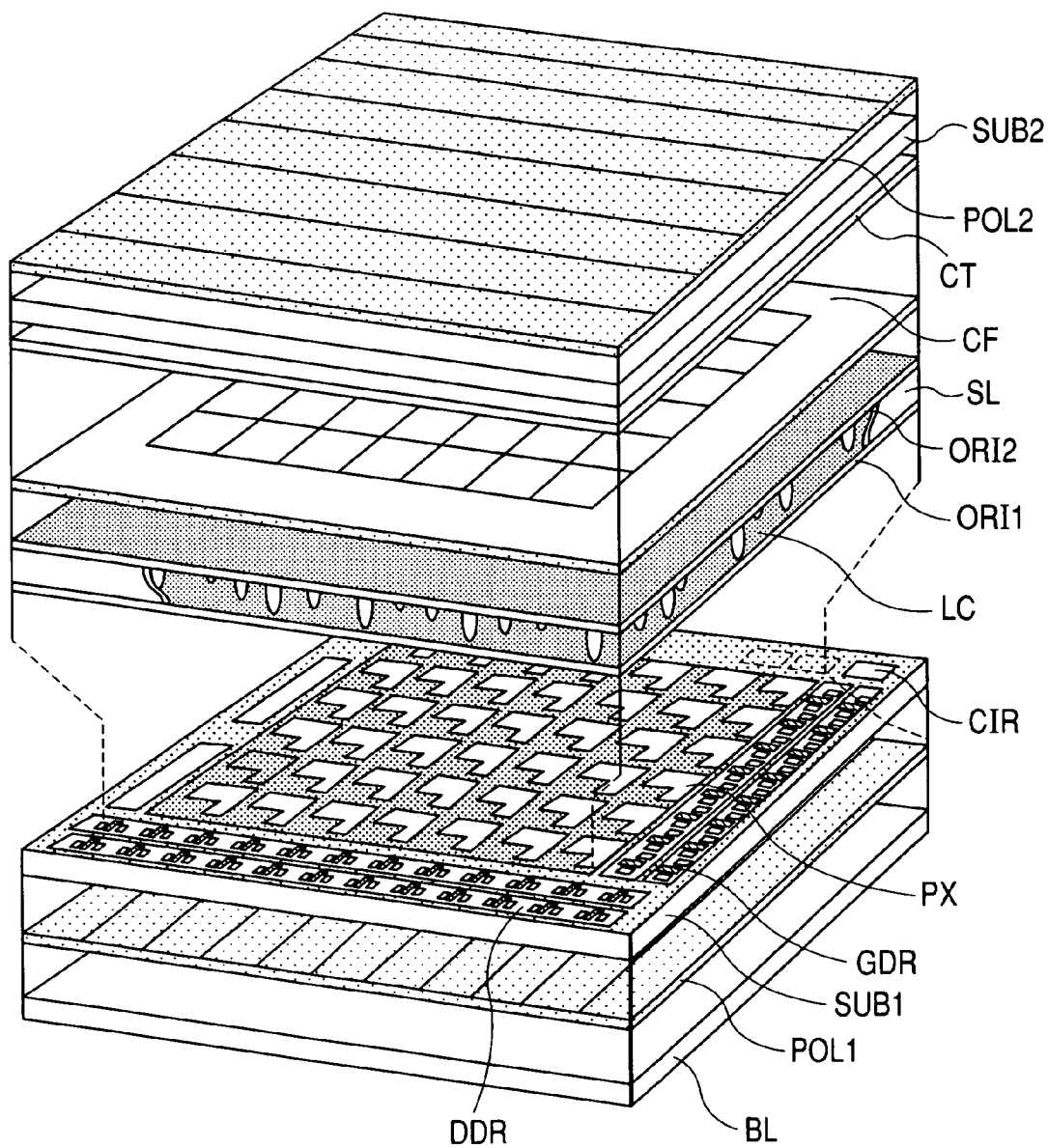
FIG. 12 is a schematic perspective development for assistance in explaining the configuration of a liquid crystal display device according to the present invention by way of example.

FIG. 12 is a schematic perspective development for assistance in explaining the configuration of a liquid crystal display device according to the present invention by way of example. The liquid crystal display device of FIG. 12 uses a liquid crystal display panel of the so-called longitudinal electric field type (TN type). In addition, the liquid crystal display device is such that liquid crystal LC is filled between a TFT substrate SUB1 and a CF substrate SUB2. The TFT substrate SUB1 is formed, on the main surface thereof, with pixel electrodes PX, and with gate drivers GDR, drain drivers DDR and attached circuits which are mounted around a pixel matrix arrangement area (display area). The pixel electrode PX comprises a large number of pixels that use thin film transistor circuits as active elements arranged in a matrix. A TFT substrate side orientation film ORI1 is formed to cover the uppermost surface including the display area. Incidentally, while the TFT substrate SUB1 is illustrated to have the same size as that of the CF substrate SUB2 in FIG. 12, in practice it protrudes from the CF substrate SUB2, which is indicated with longitudinal dotted lines.

The CF substrate SUB2 is formed on the main surface thereof with an opposing electrode (also referred to as a common electrode in this type) CT and with a color filter CF. In addition, a CF substrate side orientation film ORI2 is formed to cover the uppermost surface including an area corresponding to the display area.

Liquid crystal LC is filled between the orientation film ORI1 of the TFT substrate SUB1 and the orientation film ORI2 of the CF substrate SUB2 and a seal SL is applied to close a gap therebetween. In addition, polarizing plates POL1 and POL2 are laminated on the outer surface of the TFT substrate SUB1 and the outer surface of the CF substrate SUB2, respectively. The liquid crystal display device is of a transparent type in which a backlight BL using the planar illumination device of the present invention described above is installed on the back of the TFT substrate SUB1.

According to the present invention, there is provided a planar illumination device that can achieve even distributions of mixed colors and luminance, downsizing and weight saving without lowering the luminous efficiency of an LED chip. In addition, there is provided a liquid crystal display device using the planar illumination device as a backlight.

It should be noted that the present invention is not limited to the embodiments described above and can be modified in various ways without departing from the technical concept of the present invention.

What is claimed is:

1. A planar illumination device comprising:
   a color mixing unit including:
   a transparent light guide plate formed in a regular polygon in planar shape; and
   an LED chip attached to a corner portion of the light guide plate and adapted to emit light with a color of light's three primary colors toward the inside of the light guide plate; and
   a reflection plate having a plurality of the mixing units mounted thereon and constituting a planer light source two-dimensionally extending;
   wherein mixed light produced by the mixing unit is emitted from an upper surface of the light guide plate;
   wherein LED chips are disposed at adjacent corner portions to each other of the light guide plate and emit light with a different color of light's three primary colors from each other; and
   wherein the light guide plate is of a regular triangle in planar shape.

2. The planar illumination device according to claim 1, wherein a lower surface of the light guide plate is subjected to a reflecting process in order to reflect the light incident from the LED chip to the upper surface of the light guide plate.

3. The planar illumination device according to claim 1, further comprising a reflection sheet that is attached to a side surface of the light guide plate excluding the corner portions to which the LED chips are attached and that is adapted to return the light incident from the LED chip to the inside of the light guide plate.

4. The planar illumination device according to claim 1, wherein the reflection plate serves as a printed circuit board having wiring adapted to supply electricity to the LED chips disposed in the color mixing units.

5. The planar illumination device according to claim 1, further comprising a diffusion sheet covering the upper surface of the light guide plate and adapted to diffuse white light produced by the color mixing units.

6. The planar illumination device according to claim 1, wherein an LED chip emitting red light, an LED chip emitting green light and an LED emitting blue light are attached to the respective corner portions of the light guide plate.

* * * * *